(12) United States Patent
Tang et al.

(10) Patent No.: US 11,348,100 B2
(45) Date of Patent: May 31, 2022

(54) FOREIGN CURRENCY TRANSACTION SYSTEM AND METHOD

(71) Applicant: MASTERCARD ASIA/PACIFIC PTE. LTD., Singapore (SG)

(72) Inventors: Hao Tang, Singapore (SG); Jiaming Li, Singapore (SG); Jason Nanton, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 726 days.

(21) Appl. No.: 16/155,204

(22) Filed: Oct. 9, 2018

(65) Prior Publication Data

US 2019/0114627 A1    Apr. 18, 2019

(30) Foreign Application Priority Data

Oct. 12, 2017   (SG) ............................ 10201708405X

(51) Int. Cl.
    *G06Q 20/38*   (2012.01)
    *G06Q 20/40*   (2012.01)
    *G06Q 20/36*   (2012.01)

(52) U.S. Cl.
    CPC ....... *G06Q 20/381* (2013.01); *G06Q 20/3678* (2013.01); *G06Q 20/405* (2013.01)

(58) Field of Classification Search
    CPC ............................. G06Q 20/381; G06Q 40/04
    See application file for complete search history.

(56) References Cited

U.S. PATENT DOCUMENTS

| | | | |
|---|---|---|---|
| 2010/0250234 A1* | 9/2010 | Azimi | G06F 40/58 704/7 |
| 2011/0066548 A1* | 3/2011 | Rodin | G06Q 20/10 705/39 |
| 2014/0019317 A1* | 1/2014 | Casares | G06Q 30/06 705/30 |
| 2016/0247136 A1* | 8/2016 | Mendoza | G07G 3/00 |
| 2017/0024723 A1* | 1/2017 | Filler | G06Q 20/326 |
| 2017/0091760 A1* | 3/2017 | Baumwald | G06Q 20/381 |
| 2017/0301005 A1* | 10/2017 | Reddy | G06Q 20/12 |

* cited by examiner

*Primary Examiner* — Jay Huang
(74) *Attorney, Agent, or Firm* — Talem IP Law, LLP

(57) ABSTRACT

A foreign currency transaction system and method can allow both users and merchants to carry out foreign currency transactions without using a point-of-sale (POS) device. In addition, users can carry out foreign currency transactions without knowing much of a foreign language in order to engage with a merchant in a foreign country. In addition, a user may lock-in a foreign currency exchange rate so that the user is able to have some certainty in relation to the foreign currency transaction, and can simplify the use of payment cards for foreign currency transactions by capturing an electronic image of a pricing indicator at a juncture of initiating a foreign currency transaction, and processing the electronic image to automatically determine a required payment amount represented on the pricing indicator.

19 Claims, 10 Drawing Sheets

FOREIGN CURRENCY TRANSACTION SYSTEM AND METHOD

TECHNICAL FIELD

The present invention relates to a foreign currency transaction system and method.

BACKGROUND

Card-based payment systems using physical payment cards such as credit cards and debit cards are ubiquitous in today's society, and are widely used for payment transactions at points-of-sale (POS) terminals (typically at brick and mortar stores), whereby most physical payment cards can used at POS terminals in nearly every country.

Typically, when a user initiates a transaction to purchase goods/services in a country other than the country where the physical payment card is issued, the user can make a selection at the POS terminal whether to accept an on-the-spot currency converted exchange rate (known as Dynamic Currency Conversion or DCC), or to accept an exchange rate which will be determined by a payment card issuer and will only be known to the user upon posting of the transaction to the user's payment card account/statement.

DCC allows users to know the amount their card will be charged, expressed in their home currency. DCC services are generally provided by third party operators in association with the merchant, and not by the payment card issuer. The payment card issuers do not provide the users with a DCC option at the POS terminal, and permit the third party operators to offer currency conversion in accordance with the card processing rules of the payment card issuers.

It should be appreciated that the use of DCC currently requires involvement of a POS terminal, and otherwise, such an option is not available for the user. This usually excludes merchants in, for example, street stalls, markets, street booths and the like. Furthermore, the likelihood is high that the aforementioned merchants do not converse in the same language as the user, which leads to further issues and difficulties with regard to carrying out transactions with the aforementioned merchants.

It is desired, therefore, to provide a system and process that alleviate one or more difficulties of the prior art, or to at least provide a useful alternative.

SUMMARY

In a first aspect, the present disclosure relates to a user device for carrying out a foreign currency transaction method, the user device comprising at least one data processor configured to:
  determine a first currency type for a payment card transaction between a user and a merchant;
  capture an electronic image of a pricing indicator of a good/service and merchant identifier, contents on the pricing indicator being handwritten and/or printed;
  process the electronic image of the pricing indicator of a good/service to determine the cost of the good/service in a first currency type and a second currency type;
  receive the cost of the good/service in both the first and second currency types;
  receive the cost of the good/service in the second currency type when using a payment card of the user;
  receive input relating to a desired payment card to be used for the payment card transaction; and
  transmit, to a payment system, transaction request data representing a request to carry out the payment card transaction, the transaction request data including a transaction quantum in a desired currency type selected by the user, and merchant account details.

In a second aspect, the present disclosure relates to a non-transitory computer-readable storage medium having stored therein executable instructions which, when executed by at least one data processor of a user device, cause the at least one data processor to execute a foreign currency transaction method, the method including steps of:
  determining a first currency type for a payment card transaction between a user and a merchant;
  capturing an electronic image of a pricing indicator of a good/service and merchant identifier, contents on the pricing indicator being handwritten and/or printed;
  processing the electronic image of the pricing indicator of a good/service to determine the cost of the good/service in a first currency type and a second currency type;
  receiving the cost of the good/service in both the first and second currency types;
  receiving the cost of the good/service in the second currency type when using a payment card of the user;
  receiving input relating to a desired payment card to be used for the payment card transaction; and
  transmitting, to a payment system, transaction request data representing a request to carry out the payment card transaction, the transaction request data including a transaction quantum in a desired currency type selected by the user, and merchant account details.

In a third aspect, the present disclosure relates to a computer-implemented foreign currency transaction method executed by at least one processor of a foreign currency transaction system, the method including steps of:
  determining, at a user device, a first currency type for a payment card transaction between a user and a merchant;
  capturing, at the user device, an electronic image of a pricing indicator of a good/service and merchant identifier, contents on the pricing indicator being handwritten and/or printed;
  processing the electronic image of the pricing indicator of a good/service to determine the cost of the good/service in a first currency type and a second currency type;
  transmitting, to the user device, the cost of the good/service in both the first and second currency types;
  transmitting, to the user device, the cost of the good/service in the second currency type when using a payment card of the user;
  receiving, at the user device, input relating to a desired payment card to be used for the payment card transaction; and
  transmitting, to a payment system, transaction request data representing a request to carry out the payment card transaction, the transaction request data including a transaction quantum in a desired currency type selected by the user, and merchant account details.

The present disclosure also relates to a foreign currency transaction system, the system comprising at least one data processor configured to:
  determine, at a user device, a first currency type for a payment card transaction between a user and a merchant;
  capture, at the user device, an electronic image of a pricing indicator of a good/service and merchant identifier, contents on the pricing indicator being handwritten and/or printed;

process the electronic image of the pricing indicator of a good/service to determine the cost of the good/service in a first currency type and a second currency type;

transmit, to the user device, the cost of the good/service in both the first and second currency types;

transmit, to the user device, the cost of the good/service in the second currency type when using a payment card of the user;

receive, at the user device, input relating to a desired payment card to be used for the payment card transaction; and transmit, to a payment system, transaction request data representing a request to carry out the payment card transaction, the transaction request data including a transaction quantum in a desired currency type selected by the user, and merchant account details.

In a yet further aspect, the present disclosure relates to a server configured for use in a foreign currency transaction system, the server comprising at least one data processor configured to:

receive, from a user device, an electronic image of a pricing indicator of a good/service and merchant identifier, contents on the pricing indicator being handwritten and/or printed;

carry out an OCR conversion of the contents;

receive, from a plurality of foreign exchange servers, a plurality of real-time exchange rates between a first currency type and a second currency type;

determine a cost of the good/service in the first currency type and the second currency type;

transmit, to the user device, the cost of the good/service in both the first and second currency types; and transmit, to the user device, the cost of the good/service in the second currency type when using a payment card of the user.

BRIEF DESCRIPTION OF THE DRAWINGS

Some embodiments of the present invention are hereinafter described, by way of example only, with reference to the accompanying drawings, in which like reference numbers refer to like components, and wherein.

DETAILED DESCRIPTION

As described below, embodiments of the present invention can allow both users and merchants to carry out foreign currency transactions without using a point-of-sale (POS) device. In addition, embodiments of the present invention also allow users to carry out foreign currency transactions without knowing much of a foreign language in order to engage with a merchant in a foreign country. Embodiments of the present invention also allow a user to lock-in a foreign currency exchange rate so that the user is able to have some certainty in relation to the foreign currency transaction. Moreover, embodiments of the present invention can simplify the use of payment cards for foreign currency transactions by capturing an electronic image of a pricing indicator at a juncture of initiating a foreign currency transaction, and processing the electronic image to automatically determine required a payment amount represented on the pricing indicator.

Embodiments of the present invention will now be described in the context of a user and a merchant agreeing to make a transaction using a payment card of the customer. The merchant is in a different country from where the user typically resides. In some embodiments, the merchant provides a good/service to a user visiting a 'brick and mortar' establishment of the merchant such as, for example, a stall, a booth, a shop, an eatery and the like. The user, upon deciding to consume or upon consuming the good/service, then wishes to carry out a transaction with the merchant.

Figure 1:
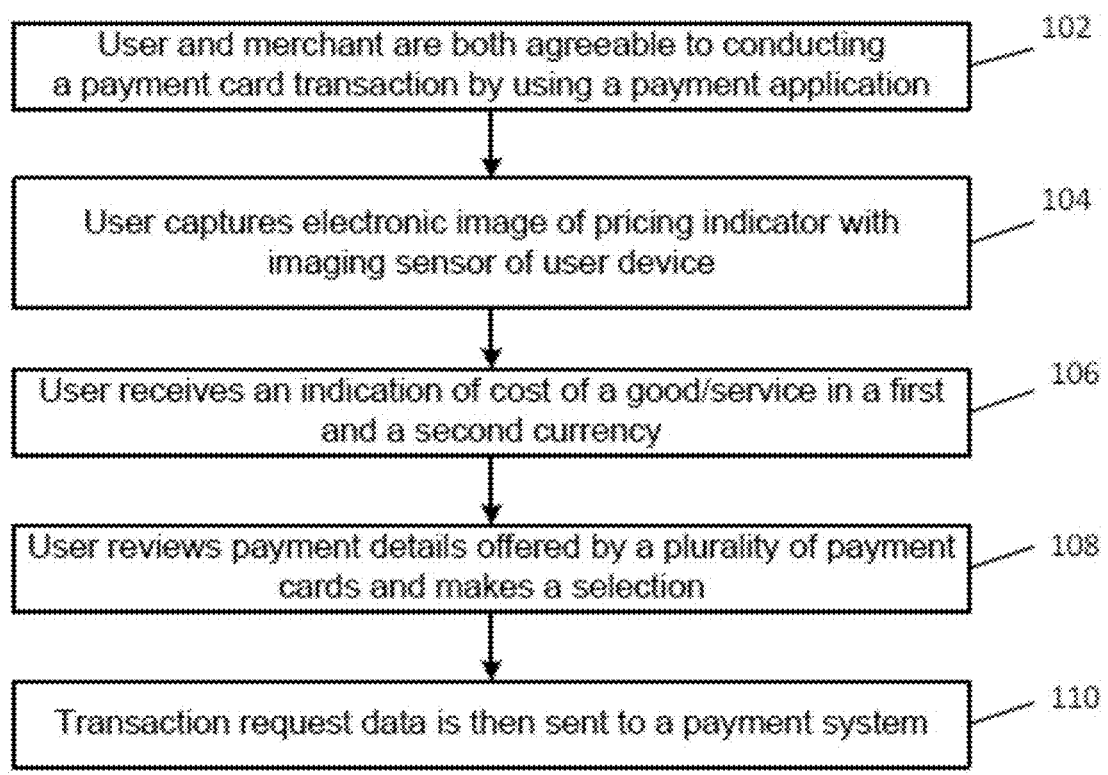
FIG. 1 is a flow diagram of a foreign currency transaction method in accordance with some embodiments of the present invention.

Referring to FIG. 1, a foreign currency transaction method between the user and the merchant is shown. For the purpose of illustration, it is assumed that the method can be performed at least in part using one or more electronic processing devices forming part of a user device in communication with one or more servers and a payment system.

At step 102, the user and the merchant are both agreeable to conducting a payment card transaction by using a payment application on a user device. This could be due to convenience for at least one of the parties, or it could be due to the user not carrying any/sufficient foreign currency. It should also be appreciated that the merchant is able to receive payment from the payment card transaction from a prior agreement to receive payment via a payment card transaction.

Figure 6:
FIG. 6 are photographs of examples of a pricing indicator.
Figure 6:
Figure 7A:
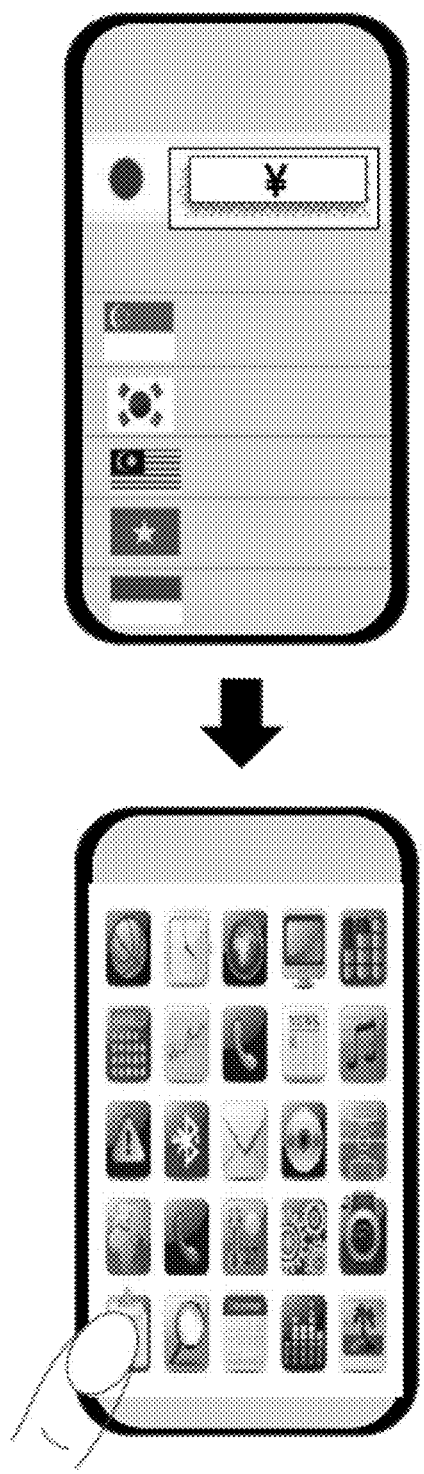
FIG. 7A-7D shows a sequence of example graphical user interfaces when carrying out a foreign currency transaction method in accordance with some embodiments of the present invention.
Figure 7B:
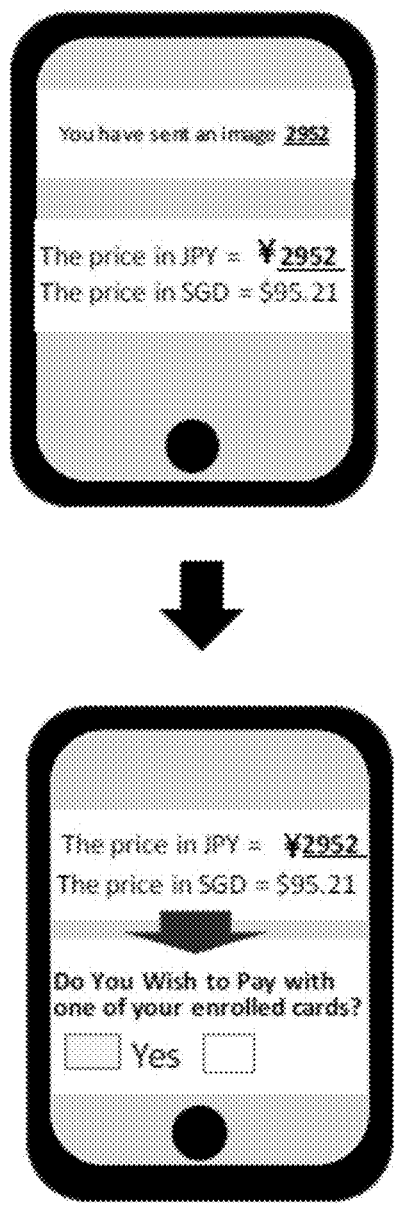
Figure 7C:
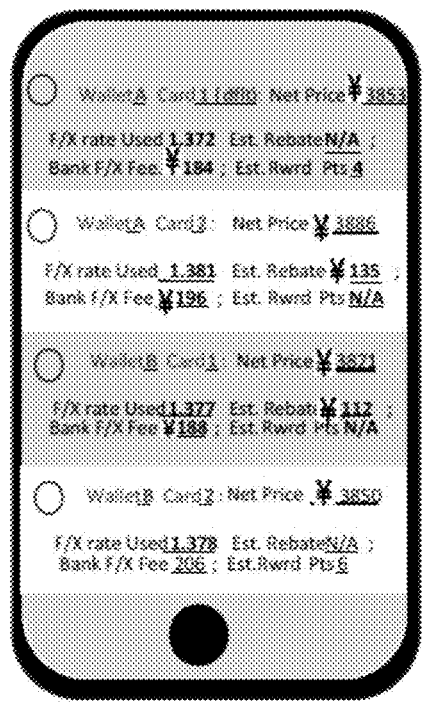
Figure 7C:
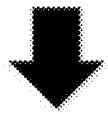
Figure 7C:
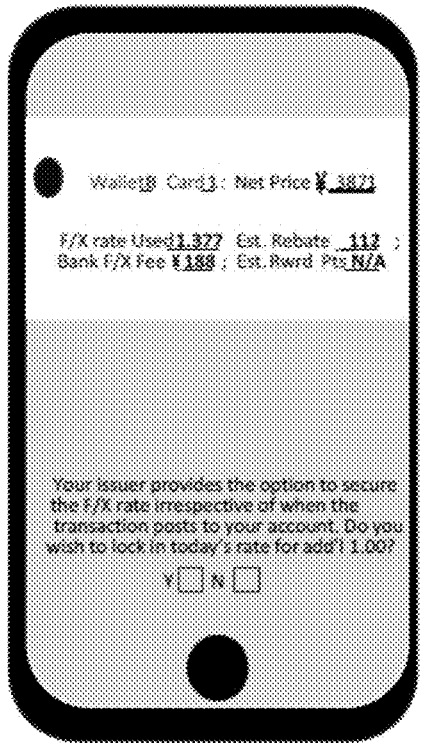
Figure 7D:
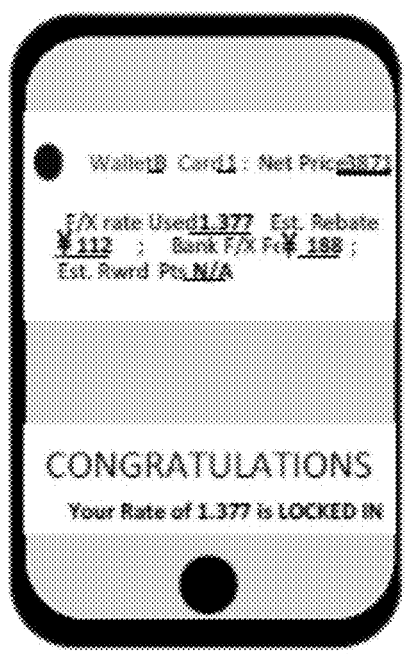
Figure 7D:
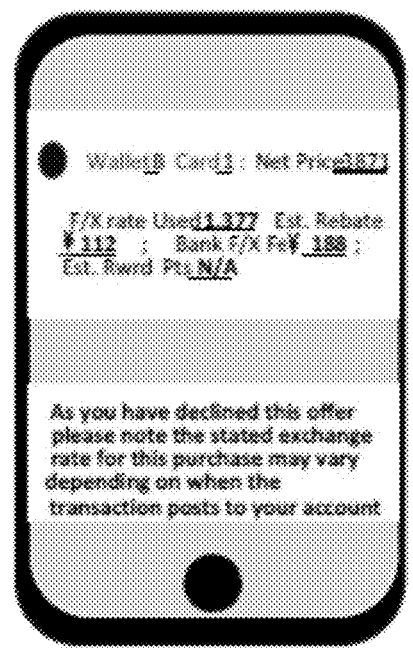

At step 104, the user uses an image sensor of the user device, such as a mobile phone, to capture an electronic image of a pricing indicator. The pricing indicator can include, for example, a dining menu, a price tag, a brochure, a catalogue, an apparel label, a sign located at the merchant's establishment, and so forth. The contents of the pricing indicator can be in a language which is native to the merchant, and can include, for example, a merchant identifier, an entire cost of a good/service, a unit cost of a good/service, a description of the good/service, and so forth. The merchant identifier can be, for example, a matrix barcode, a serial number, a visual logo, text defining a name of the merchant establishment, and so forth. The contents of the pricing indicator can be, for example, hand written, generated by a word/image processor, generated by a code generator, or a combination of the aforementioned. For the sake of illustration, examples of the pricing indicator are depicted in FIG. 6. Processing of the electronic image is based on standard image processing methods known to those skilled in the art. For example, artificial neural networks are used to carry out the image processing. Alternatively, optical character recognition (OCR) and image classification algorithms can be used by assessing, for instance, pixel brightness at each point, red/green/blue pixel density at each point, text and numbers present on the card, image size/shape and so forth in order to carry out the image processing.

Once the electronic image is captured, the user then receives, at step 106, an indication of the cost of the good/service in a first currency (currency that an issuer of the payment card would charge the user in) and a second currency (currency in which the merchant carries out trade), as derived from a real-time exchange rate between the first currency and the second currency. This step is important for the user to confirm with some degree of certainty, that the contents of the pricing indicator are processed in a likely-to-be-correct manner, since the user is able to benchmark the cost of the good/service in the first currency which the user is most familiar with. It should be appreciated that the first currency is likely to be a currency of the country where the user typically resides.

After the user has considered the cost of the good/service in the first currency and the second currency, the user then reviews, at step 108, payment details offered by a plurality of payment cards which are associated with the user's digital wallet, and makes a selection for a desired payment card. The payment details from the plurality of payment cards can include, for example, payable cost of the good/service in the second currency, applicable exchange rate, foreign exchange service fee, estimated cashback, estimated incentive points, and so forth. By reviewing the payment details, the user is able to know with certainty, the actual payable cost of the good/service in the second currency for a particular payment card, can lock-in a foreign exchange currency rate as well have visibility of the other payment details for the transaction.

Once the user selects the desired payment card in the user's digital wallet, transaction request data is then sent to a payment system at step 110. It should be appreciated that the transaction request data includes information of the merchant's account details such that the requisite monies are deposited in the correct account in a manner whereby the issuer routes the payment to the acquirer. It should also be appreciated that in a token-based transaction system, the token used for payment can be flagged to transact using the locked-in exchange rate, which indicates to the issuer that the payment will be in the issuer's currency and specified rate. Even though the payment system is a typical payment system that is operated to provide both users and merchants access to payment card services, further details in relation to the payment system will be provided in a subsequent portion of the description.

Accordingly, the above described method provides a number of advantages.

It should be appreciated that the foreign currency transaction method can allow both users and merchants to carry out foreign currency transactions without using a point-of-sale (POS) device. In addition, the users need not know much of a foreign language in order to engage with a merchant in a foreign country, and the user can lock-in a foreign currency exchange rate and have visibility of requisite payment details so that the user is able to have some certainty in relation to the foreign currency transaction. Moreover, the method can simplify the use of payment cards for foreign currency transactions by merely involving capturing an electronic image of a pricing indicator at a juncture of initiating a foreign currency transaction, and processing the electronic image to automatically determine required a payment amount represented on the pricing indicator.

A number of further features will now be described.

In order to further enhance security, communication with the user device may be encrypted. In one example, the digital wallet application installed on the user device may have embedded encryption that can only be decrypted by the payment system. In this way, user account information received by the payment system may be routed securely over the network and interpreted only for use in initiating payment authorisation with the payment system.

In one example, the one or more electronic processing devices of the user device may send a request to access a digital wallet application installed on the user device in order to retrieve user account information. Typically, the digital wallet application is configured to verify the user to selectively provide the user account information.

In this regard, the digital wallet application may prompt the user to provide verification information, selectively authenticate the user using the verification information and provide access to the user account information in response to successful verification. Typically, the verification information includes a PIN number associated with the digital wallet application. However, any form of verification information may be used, including biometric information such as fingerprint data, iris data, facial features data, pulse rate data, voice data, retina data, ear cavity echo data, vein pattern data and speech pattern data. The user provides their PIN number to the digital wallet application which verifies the PIN typically at a remote server where the user security details are stored. If the PIN is verified as correct, the user is authenticated as being the owner of the digital wallet application and in response the digital wallet application provides the user account details to the payment system so that the payment authorization process can be initiated.

Figure 2:
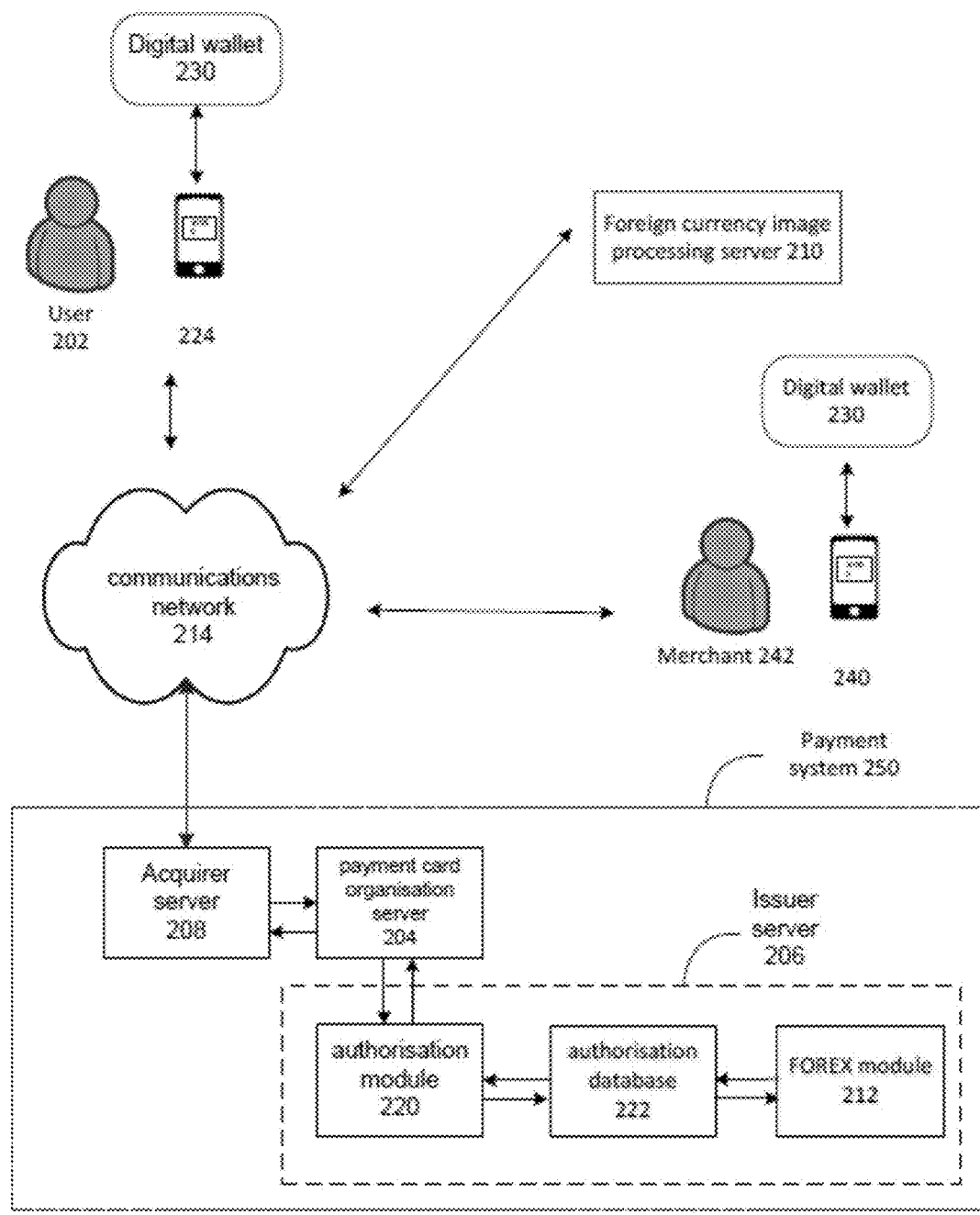
FIG. 2 is a block diagram showing components of a foreign currency transaction system in accordance with some embodiments of the present invention.

An example of a system for foreign currency transaction will now be described with reference to FIG. 2.

In this example, the system includes a foreign currency image processing server 210, one or more user devices 224 (operated by a user 202) and merchant devices 240 (operated by a merchant 242) respectively running a payment application 230 such as a digital wallet application, a communications network 214, an issuer server 206 which includes a FOREX module 212, a payment card organisation server 204 and an acquirer server 208. It should be noted that the issuer server 206, the payment card organisation server 204 and the acquirer server 208 can be collectively viewed as a payment system 250. Although only one issuer server 206 is shown in FIG. 2, there can be a plurality of issuer servers 206, as will be illustrated in subsequent portions of the description.

The communications network 214 can be of any appropriate form, such as the Internet and/or a number of local area networks (LANs). It will be appreciated that the configuration shown in FIG. 2 is for the purpose of example only, and in practice, the various aforementioned devices and servers can communicate with each other via any appropriate mechanism, such as via wired or wireless connections, including, but not limited to, mobile networks, private networks, such as an 802.11 network, the Internet, LANs, WANs, or the like, as well as via direct or point-to-point connections, such as Bluetooth, or the like.

User Device

Figure 3:
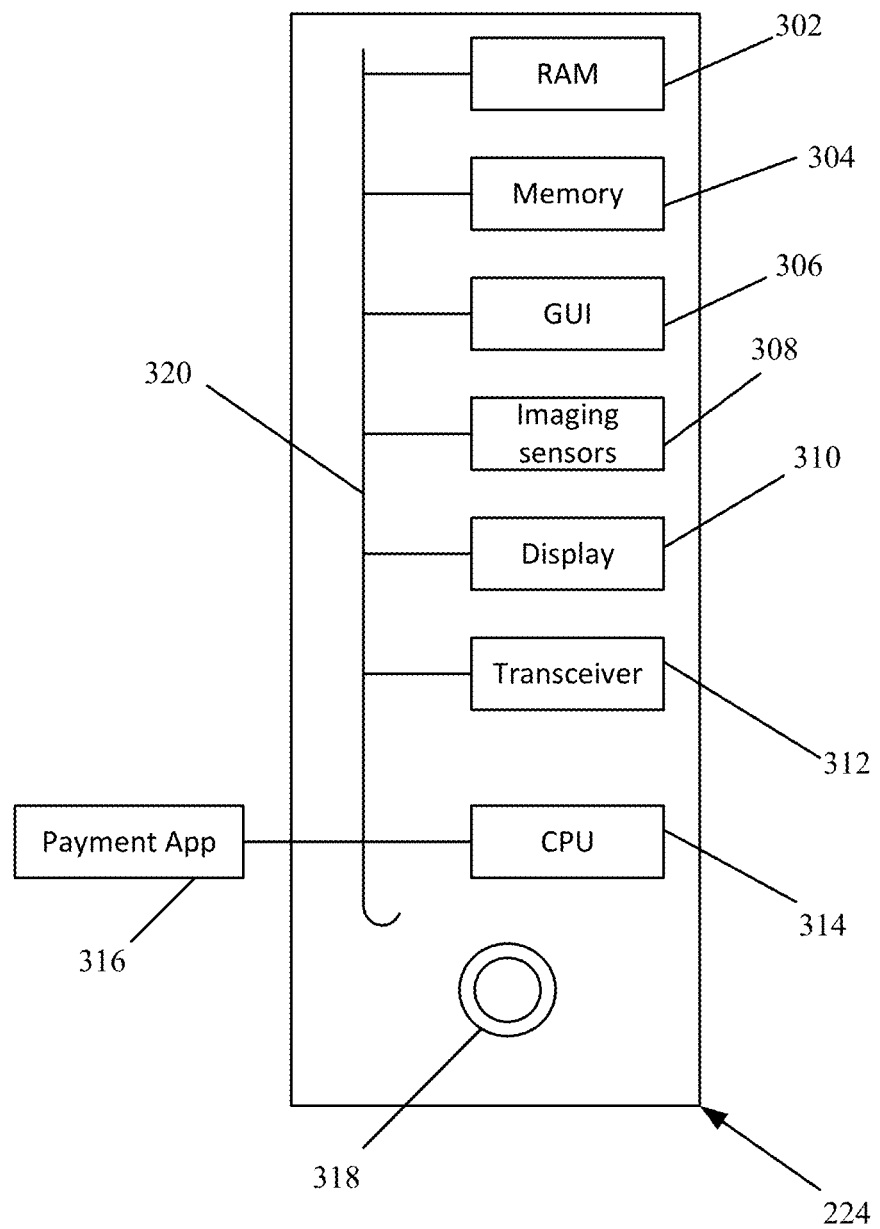
FIG. 3 is a block diagram showing components of a user device of the foreign currency transaction system in accordance with some embodiments of the present invention.

The user device 224 of any of the examples herein may be a handheld computer device such as a smart phone or a PDA such as one manufactured by Apple™, LG™, HTC™, Huawei™, Samsung™ or Motorola™. The user device 224 may be a mobile computer such as a tablet computer. Furthermore, the user device 224 may also be a wearable device like a smartwatch. An exemplary embodiment of the user device 224 is shown in FIG. 3. As shown, the device 224 includes the following components in electronic communication via a bus 320:

1. a display 310;
2. non-volatile memory 304;
3. random access memory ("RAM") 302;
4. N processing components 314;
5. a transceiver component 312 that includes N transceivers;
6. imaging sensors 308;
7. a graphical user interface 306; and
8. user controls 318.

Although the components depicted in FIG. 3 represent physical components, FIG. 3 is not intended to be a hardware diagram; thus many of the components depicted in FIG. 3 may be realized by common constructs or distributed among additional physical components. Moreover, it is certainly contemplated that other existing and yet-to-be developed physical components and architectures may be utilized to implement the functional components described with reference to FIG. 3.

The display 310 generally operates to provide a presentation of content to a user, and may be realized by any of a variety of displays (e.g., CRT, LCD, HDMI, micro-projector and OLED displays). And in general, the non-volatile memory 304 functions to store (e.g., persistently store) data and executable code including code that is associated with the functional components of a browser component and applications, and in one example, the payment application 316 (for example, a digital wallet application). In some embodiments, for example, the non-volatile memory 304 includes bootloader code, modem software, operating system code, file system code, and code to facilitate the implementation of one or more portions of the payment application 316 as well as other components well known to those of ordinary skill in the art that are not depicted for simplicity.

In many implementations, the non-volatile memory 304 is realized by flash memory (e.g., NOR or NAND memory), but it is certainly contemplated that other memory types may be utilized as well. Although it may be possible to execute the code from the non-volatile memory 304, the executable code in the non-volatile memory 304 is typically loaded into RAM 302 and executed by one or more of the N processing components 314.

The N processing components 314 in connection with RAM 302 generally operate to execute the instructions stored in non-volatile memory 304 to effectuate the functional components. As one of ordinarily skill in the art will appreciate, the N processing components 314 may include a video processor, modem processor, DSP, graphics processing unit (GPU), and other processing components.

The transceiver component 312 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

The imaging sensors 308 can comprise, for example, semiconductor charge-coupled devices (CCDs), complementary metal-oxide-semiconductor (CMOS) devices and so forth. The imaging sensors 308 are configured to capture images, particularly images of the pricing indicators as mentioned in the preceding paragraphs. It is preferable that the imaging sensors 308 are configured to capture images in both good and poor lighting conditions, as the merchant establishments where the pricing indicators are used at can be poorly lit, for example, an outdoor street food stall at night. The imaging sensors 308 can be integrated together or separate components. It should be appreciated that the imaging sensors 308 can be activate-able on-demand by the payment application 316.

Figure 4:
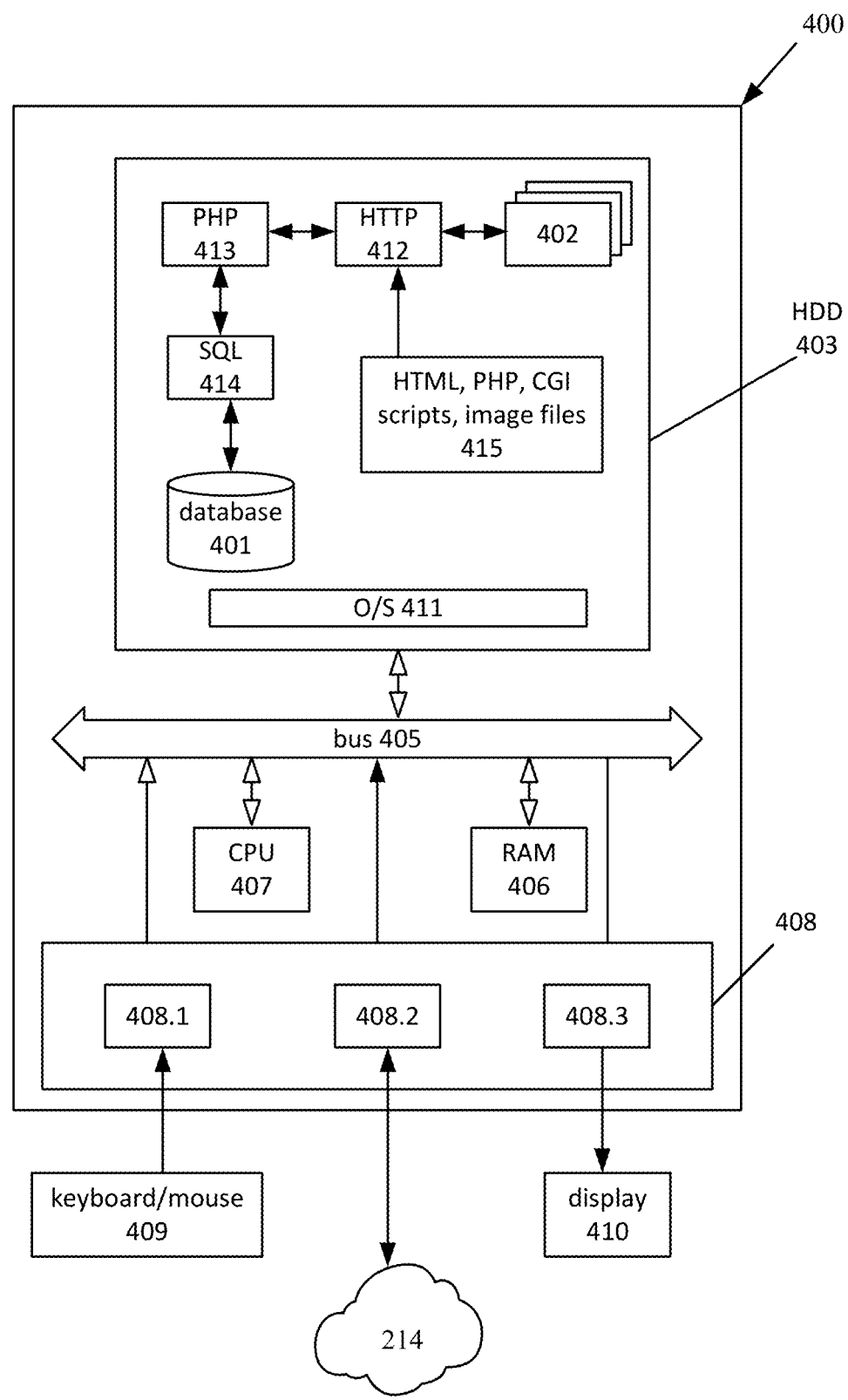
FIG. 4 a block diagram showing components of a currency server of the foreign currency transaction system in accordance with some embodiments of the present invention.

Payment Card Organisation Server, Issuer Server, Acquirer Server, Foreign Currency Image Processing Server The payment card organisation server 204, the issuer server 206, the acquirer server 208, and the foreign currency image processing server 210 of any of the examples herein may be formed of any suitable processing device, and one such suitable device is shown in FIG. 4. In this example, a processing device is provided by a computing system 400 in communication with a database 401, as shown in FIG. 4. The computing system 400 is able to communicate with other processing devices, as required, over a communications network 214 using standard communication protocols.

The components of the computing system 400 can be configured in a variety of ways. The components can be implemented entirely by software to be executed on standard computer server hardware, which may comprise one hardware unit or different computer hardware units distributed over various locations, some of which may require the communications network 214 for communication. A number of the components or parts thereof may also be implemented by application specific integrated circuits (ASICs) or field programmable gate arrays.

In the example shown in FIG. 4, the computing system 400 is a commercially available server computer system based on a 32 bit or a 54 bit Intel architecture, and the processes and/or methods executed or performed by the computing system 400 are implemented in the form of programming instructions of one or more software components or modules 402 stored on non-volatile (e.g., hard disk) computer-readable storage 403 associated with the computing system 400. At least parts of the software modules 402 could alternatively be implemented as one or more dedicated hardware components, such as application-specific integrated circuits (ASICs) and/or field programmable gate arrays (FPGAs).

The computing system 400 includes at least one or more of the following standard, commercially available, computer components, all interconnected by a bus 405:
1. random access memory (RAM) 406;
2. at least one computer processor 407, and
3. external computer interfaces 408:
   a. universal serial bus (USB) interfaces 408.1 (at least one of which is connected to one or more user-interface devices, such as a keyboard, a pointing device 409 (for example, a mouse or touchpad),
   b. a network interface connector (NIC) 408.2 which connects the computing system 400 to the data communications network 214; and
   c. a display adapter 408.3, which is connected to a display device 410 such as a liquid-crystal display (LCD) panel device.

The computing system 400 includes a plurality of standard software modules, including:
1. an operating system (OS) 411 (e.g., Linux or Microsoft Windows);
2. web server software 412 (e.g., Apache, available at http://www.apache.org);
3. scripting language modules 413 (e.g., personal home page, available at http://www.php.net, or Microsoft ASP); and 4. structured query language (SQL) modules 414 (e.g., MySQL, available from http://www.mysql.com), which allow data to be stored in and retrieved/accessed from an SQL database.

Together, the web server 412, scripting language 413, and SQL modules 414 provide the computer system 400 with the general ability to allow users of the Internet (via the data communications network 214) with standard computing devices equipped with standard web browser software to access the computing system 500 and in particular to provide data to and receive data from the database 401. It will be understood by those skilled in the art that the specific functionality provided by the computing system 400 to such users is provided by scripts accessible by the web server 412, including the one or more software modules 402 implementing the processes performed by the computing system 400, and also any other scripts and supporting data 415, including markup language (e.g., HTML, XML) scripts, PHP (or ASP), and/or CGI scripts, image files, style sheets, and the like.

The boundaries between the modules and components in the software modules 402 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the steps of the processes performed by the computing system 400 may be executed by a module (of software modules 402) or a portion of a module. The processes may be embodied in a non-transient machine-readable and/or computer-readable medium for configuring a computer system to execute the method. The software modules 402 may be stored within and/or transmitted to a computer system memory to configure the computing system 400 to perform the functions of the module.

The computing system 400 normally processes information according to a program (a list of internally stored instructions such as a particular application program and/or an operating system) and produces resultant output information via input/output (I/O) devices (via external computer interfaces 408). A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Payment System

The payment system 250 comprises the issuer server 206, the payment card organisation server 204 and the acquirer server 208. Typically, the payment system 250 includes electronic data processing systems operated by or on behalf of at least three businesses or organisations to provide payment card services to users and merchants. These three organisations include a "payment card organisation" (such as Mastercard™) that operates a payment card system and network, and licenses use of its payment card system and network to the other organisations. Another of these organisations is referred to as "the issuer" because it issues payment cards to its customers (under license from the payment card organisation). In the context of the described embodiments, the issuer 206 is the bank providing the user's payment card. The third organisation 208, known as "the acquirer", uses the payment card organisation's payment card system and network to receive payments from the issuer 206. In the context of the described embodiments, the acquirer 208 is the merchant's bank.

When the merchant 242 and the user 202 both wish to effect a payment card transaction using the user's payment card (via the user's digital wallet 230), the user device 224 will transmit transaction request data to the payment system 250 via the communications network 214.

Upon reception of the transaction request data at the payment system 250, the acquirer server 208 sends an authorisation request message to the payment card organisation server 204, which in turn forwards the authorisation request message to an authorisation module 220 of the issuer server 206. The authorisation module 220 then executes an authentication process to determine whether or not to allow authorisation of the authorisation request. If it is determined that authorisation should be allowed, then typically, payment card information from the transaction request is used to retrieve and compare with corresponding information from an authorisation database 222. If the two sets of information do not match, then authorisation is denied and payment to the merchant 242 is denied.

Otherwise, if the two sets of information match, the user's payment card information (or at least a database key corresponding to that information) is used to retrieve, from the authorisation database 222, predetermined second authentication factor data associated with the user's payment card. This retrieved data represents, or at least corresponds to, one or more authentication indications that are to be made by the user 202 at the time of requesting authorisation for a payment card transaction in order to authenticate the user 202 to the issuer. Upon successful authentication, the issuer then routes payment to the acquirer (in subsequent settlement and clearance processes as known in the art) who then deposits monies into the merchant's account.

Foreign Currency Image Processing Server

Typically, the foreign currency image processing server 210 is administered by an entity that derives revenue from dealings with foreign currencies. In some embodiments, the foreign currency image processing server 210 is utilised if image processing of the pricing indicator is not carried out at the user device 224

When the foreign currency image processing server 210 receives an electronic image of the pricing indicator, the image is processed to determine the cost of the good/service in a first currency type and a second currency type. Processing of the electronic image is based on standard image processing methods known to those skilled in the art. For example, neural networks are used to carry out the image processing. Alternatively, optical character recognition (OCR) and image classification algorithms can be used by assessing, for instance, pixel brightness at each point, red/green/blue pixel density at each point, text and numbers present on the card, image size/shape and so forth in order to carry out the image processing.

FOREX Module

Once the contents of the pricing indicator are determined, the FOREX module 212 determines a real-time exchange rate for the merchant's currency against the user's home currency, specifically, a currency that an issuer of the user's payment card would charge the user in. In addition, further information of a plurality of payment cards associated with the user's digital wallet is obtained from a plurality of FOREX modules 212 (from a plurality of issuer servers 206) such as, for example, exchange rates used by respective issuers, a value of at least one accruable incentive awarded by the respective issuers, a value of a foreign exchange service fee payable for respective issuers, and so forth. The at least one accruable incentive can include, for example, incentive points, cashback, a combination of the aforementioned and so forth.

As such, the cost of the good/service in a first currency type and a second currency type is determined, and the further information of the plurality of payment cards obtained from the FOREX modules 212 is also usable in some embodiments.

Figure 5:
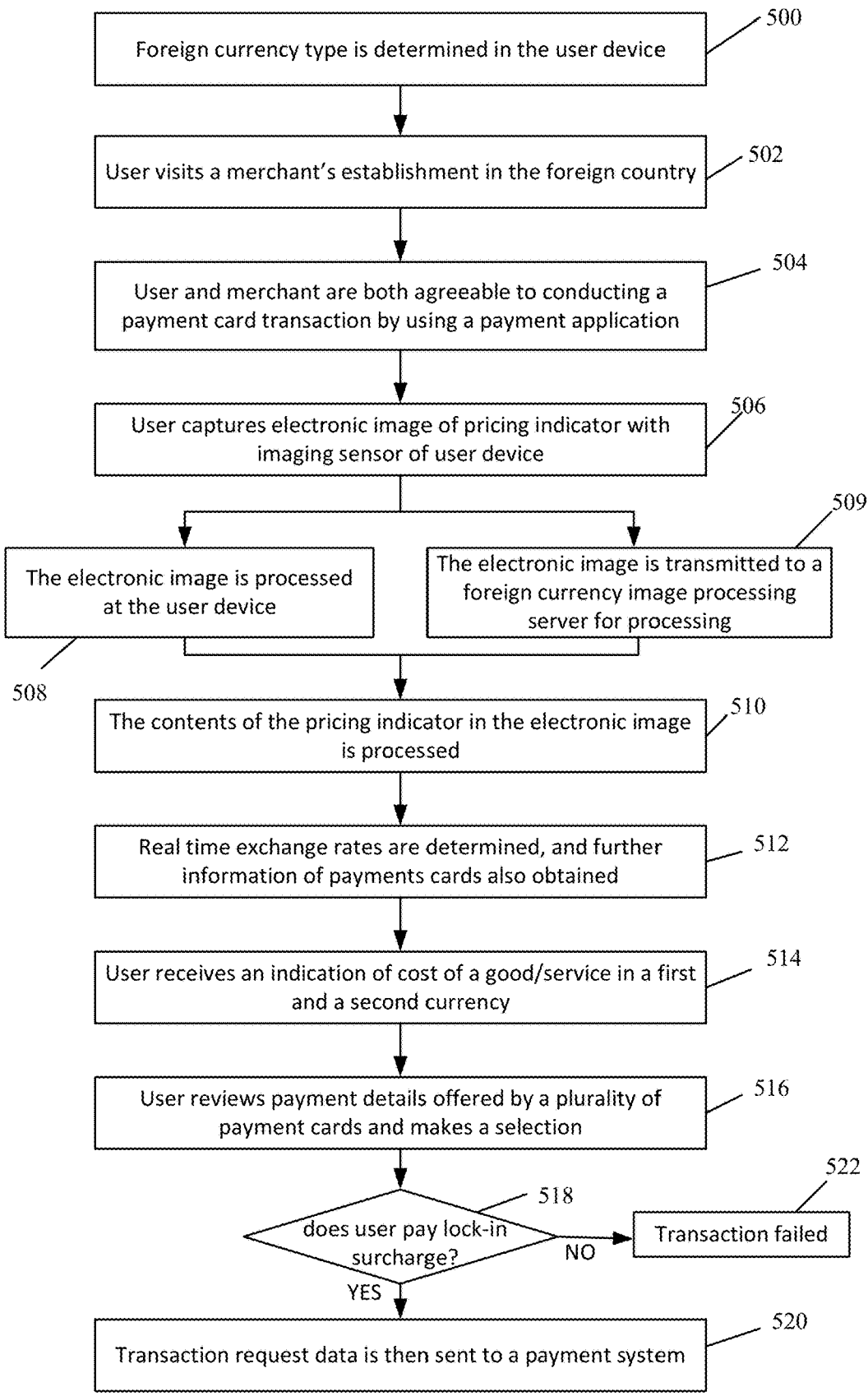
FIG. 5 is a flow diagram of a specific example of a foreign currency transaction method according to certain embodiments.

To illustrate further features of preferred practical implementations of the method, a detailed example of a foreign currency transaction method will now be described with reference to FIG. 5. In addition, reference will also concurrently be made to FIG. 7A to 7D to illustrate possible embodiments of a graphical user interface (GUI) on a user device during the foreign currency transaction method.

At step 500, at any time when the user is in a foreign country (which is not in the country which the user typically resides in), the user accesses a payment application on the user device. The payment application is configured to rely on, for example, geolocation, mobile cellular signal source, and so forth to determine the current location and a foreign currency type that is prevailing at that location. The step 500 can be carried out automatically at a first instance the user accesses the payment application in the foreign country. The foreign currency type should be the currency in which merchants in the foreign country typically carry out their transactions in. Step 500 can be carried out on a GUI shown in (1) of FIG. 7A. Alternatively, the foreign currency type can be determined at step 510, if the price indicator includes respective currency symbols, such as "$", "€", "¥", "£" or the like.

At any time, at step 502, the user visits a merchant's establishment in the foreign country. The merchant establishment can be indoors or outdoors and can be, for example, a stall, a booth, a shop, an eatery and the like. Subsequently, once the user agrees to consume a good/service at the merchant establishment, the user and the merchant can then agree to carry out a payment process using a payment card of the user at step 504 even when the merchant does not have a POS device on site by accessing a payment application on a user device. It should be appreciated that the merchant should have a facility to receive funds electronically in order for the payment process to be carried out in the desired manner. Step 504 can be carried out on a GUI shown in (2) of FIG. 7A.

At step 506, the user uses an image sensor of a user device (as described earlier) to capture an electronic image of a pricing indicator at the merchant establishment. The image sensor can be controlled by the payment application, or an imaging application can be controlled by the payment application in order to capture the electronic image. The pricing indicator can include, for example, a dining menu, a price tag, a brochure, a catalogue, an apparel label, a sign located at the merchant's establishment, and so forth. The contents of the pricing indicator can be in a language which is native to the merchant, and can include, for example, a merchant identifier, an entire cost of a good/service, a unit cost of a good/service, a description of the good/service, and so forth. The merchant identifier can be, for example, a matrix barcode, a serial number, a visual logo, text defining a name of the merchant establishment, and so forth. The contents of the pricing indicator can be, for example, hand written, generated by a word/image processor, generated by a code generator, or a combination of the aforementioned.

Subsequently, at step 508, the electronic image is processed at the user device. More specifically, contents on the pricing indicator are processed to determine the cost of the good/service in a first currency type and a second currency type.

Alternatively, at step 509, the electronic image is transmitted to a foreign currency image processing server for processing.

Subsequently, the image is processed at step 510, more specifically, contents on the pricing indicator, to determine the cost of the good/service in a first currency type and a second currency type. Processing of the electronic image is based on standard image processing methods known to those skilled in the art. For example, neural networks are used to carry out the image processing. Alternatively, optical character recognition (OCR) and image classification algorithms can be used by assessing, for instance, pixel brightness at each point, red/green/blue pixel density at each point, text and numbers present on the card, image size/shape and so forth in order to carry out the image processing.

Once the contents of the pricing indicator are determined, an issuer server, in particular, a FOREX module determines a real-time exchange rate for that merchant's currency against the user's home currency at step 512, specifically, a currency that an issuer of the user's payment card would charge the user in. In addition, further information of a plurality of payment cards associated with the user's digital wallet is obtained from a plurality of issuer servers, such as, for example, exchange rates used by respective issuers, a value of at least one accruable incentive awarded by the respective issuers, a value of a foreign exchange service fee payable for respective issuers, and so forth. The at least one accruable incentive can include, for example, incentive points, cashback, a combination of the aforementioned and so forth.

At step 514, the user received an indication of the cost of the good/service in the merchant's currency type and the user's home currency type. There can also be a confirmation message of the transmission of the electronic image to the currency system. Step 514 can be depicted on a GUI shown in (3) of FIG. 7B.

Subsequently, at step 516, if the user wishes to use the digital wallet, the user can review further information of the plurality of payment cards obtained from the plurality of issuer servers to determine which payment card from the user's digital wallet would be most desirable to the user. Step 516 can be depicted on a GUI shown in (4) of FIG. 7B, and subsequently, in (5) of FIG. 7C.

At step 518, the user decides whether or not to pay a lock-in surcharge in order to use a desired payment card, whereby payment of the lock-in surcharge is at least to confirm an exchange rate for the foreign currency transaction, and to confirm an amount of accruable incentive(s) for the foreign currency transaction. Step 518 can be depicted on a GUI shown in (6) of FIG. 7C.

If the user decides not to pay the lock-in surcharge, the transaction fails at step 522. Step 522 can be depicted on a GUI shown in (8) of FIG. 7D. However, if the user proceeds with the payment of the lock-in surcharge, transaction request data is then sent to a payment system at step 520 in order to complete the foreign currency transaction. It should be appreciated that the transaction request data includes information of the merchant's account details such that the requisite monies are deposited in the correct account in a manner whereby the issuer routes the payment to the acquirer. It should also be appreciated that in a token-based transaction system, the token used for payment can be flagged to transact using the locked-in exchange rate, which indicates to the issuer that the payment will be in the issuer's currency and specified rate. Step 520 can be depicted on a GUI shown in (7) of FIG. 7D.

It should be appreciated that the specific example described above would provide both users and merchants the convenience to carry out foreign currency transactions without using a point-of-sale (POS) device. In addition, the users need not know much of a foreign language in order to engage and carry out transactions with a merchant in a foreign country, and the user can lock-in a foreign currency exchange rate and have visibility of requisite payment details so that the user is able to have some certainty and can accrue incentives in relation to the foreign currency transaction. Moreover, the method can simplify the use of payment cards for foreign currency transactions by merely involving capturing an electronic image of a pricing indicator at a juncture of initiating a foreign currency transaction, and processing the electronic image to automatically determine required a payment amount represented on the pricing indicator.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A user device for carrying out a foreign currency transaction method, the user device comprising at least one data processor configured to:
   determine a first currency type for a payment card transaction between a user and a merchant;
   capture an electronic image of a pricing indicator of a good/service and merchant identifier, contents on the pricing indicator being handwritten and/or printed;
   process the electronic image of the pricing indicator of the good/service to determine the contents on the pricing indicator;
   communicate, to a payment system, the contents on the pricing indicator to be used to determine cost of the good/service in a first currency type and a second currency type;
   receive the cost of the good/service in both the first and second currency types;
   receive, from a plurality of issuers of the payment system, a plurality of payable costs of the good/service in the second currency type for a plurality of payment cards of the user, each payable cost of the plurality of payable costs being a payable cost of the good/service in the second currency type when using a corresponding payment card of the plurality of payment cards of the user based on one or more of an exchange rate used by a corresponding issuer of the corresponding payment card and a value of a foreign exchange service fee, the payable cost of the good/service in the second currency type when using a payment card of the user being different than the cost of the good/service in the second currency type;
   display, the plurality of payable costs of the good/service in the second currency type;
   receive input relating to a desired payment card of the plurality of payment cards to be used for the payment card transaction; and
   transmit, to the payment system, transaction request data representing a request to carry out the payment card transaction, the transaction request data including a transaction quantum in a desired currency type selected by the user, and merchant account details.

2. The user device of claim 1, wherein at least one of the plurality of payment cards is associated with a digital wallet of the user.

3. The user device of claim 1, wherein the at least one data processor is further configured to receive a value of at least one accruable incentive when using at least one of the plurality of payment cards for the payment card transaction.

4. The user device of claim 3, wherein the at least one accruable incentive comprises incentive points and/or cashback.

5. The user device of claim 1, wherein the at least one data processor is further configured to define the second currency type.

6. The user device of claim 1, wherein the at least one data processor is further configured to allow an addition of a lock-in surcharge to each payable cost of the plurality of payable costs of the good/service in the second currency type, the lock-in surcharge being payable to ensure no variation in the payable cost of the good/service in the second currency type, wherein the transaction quantum includes the lock-in surcharge.

7. A non-transitory computer-readable storage medium having stored thereon executable instructions which, when executed by at least one data processor of a user device, cause the at least one data processor to execute a foreign currency transaction method, the method including steps of:
   determining a first currency type for a payment card transaction between a user and a merchant;
   capturing an electronic image of a pricing indicator of a good/service and merchant identifier, contents on the pricing indicator being handwritten and/or printed;
   processing the electronic image of the pricing indicator of the good/service to determine the contents on the pricing indicator;
   communicating, to a payment system, the contents on the pricing indicator to be used to determine cost of the good/service in a first currency type and a second currency type;
   receiving the cost of the good/service in both the first and second currency types;
   receiving, from a plurality of issuers of the payment system, a plurality of payable costs of the good/service in the second currency type for a plurality of payment cards of the user, each payable cost of the plurality of payable costs being a payable cost of the good/service in the second currency type when using a corresponding payment card of the plurality of payment cards of the user based on one or more of an exchange rate used by a corresponding issuer of the corresponding payment card and a value of a foreign exchange service fee, the payable cost of the good/service in the second currency type when using a payment card of the user being different than the cost of the good/service in the second currency type;

displaying, the plurality of payable costs of the good/service in the second currency type;

receiving input relating to a desired payment card of the plurality of payment cards to be used for the payment card transaction; and transmitting, to the payment system, transaction request data representing a request to carry out the payment card transaction, the transaction request data including a transaction quantum in a desired currency type selected by the user, and merchant account details.

8. The storage medium of claim 7, wherein at least one of the plurality of payment cards is associated with a digital wallet of the user.

9. The storage medium of claim 7, wherein the method further comprises the step of receiving a value of at least one accruable incentive when using at least one of the plurality of payment cards for the payment card transaction.

10. The storage medium of claim 9, wherein the at least one accruable incentive comprises incentive points and/or cashback.

11. The storage medium of claim 7, wherein the method further comprises the step of defining the second currency type.

12. The storage medium of claim 7, wherein the method further comprises the step of allowing an addition of a lock-in surcharge to each payable cost of the plurality of payable costs of the good/service in the second currency type, the lock-in surcharge being payable to ensure no variation in the payable cost of the good/service in the second currency type, wherein the transaction quantum includes the lock-in surcharge.

13. A computer-implemented foreign currency transaction method executed by at least one processor of a foreign currency transaction system, the method including steps of:

determining, at a user device, a first currency type for a payment card transaction between a user and a merchant;

capturing, at the user device, an electronic image of a pricing indicator of a good/service and merchant identifier, contents on the pricing indicator being handwritten and/or printed;

processing the electronic image of the pricing indicator of the good/service to determine the contents on the pricing indicator;

communicate, to a payment system, the contents on the pricing indicator to be used to determine cost of the good/service in a first currency type and a second currency type;

transmitting, to the user device, the cost of the good/service in both the first and second currency types;

transmitting, to the user device, a plurality of payable costs of the good/service in the second currency type for a plurality of payment cards of the user, each payable cost of the plurality of payable costs being a payable cost of the good/service in the second currency type when using a corresponding payment card of the plurality of payment cards of the user based on one or more of an exchange rate used by a corresponding issuer of the corresponding payment card and a value of a foreign exchange service fee, the payable cost of the good/service in the second currency type when using a payment card of the user being different than the cost of the good/service in the second currency type;

receiving, at the user device, input relating to a desired payment card of the plurality of payment cards to be used for the payment card transaction; and transmitting, to the payment system, transaction request data representing a request to carry out the payment card transaction, the transaction request data including a transaction quantum in a desired currency type selected by the user, and merchant account details.

14. The foreign currency transaction method of claim 13, wherein the processing of the electronic image comprises:
carrying out an OCR conversion of the contents on the pricing indicator;
determining an orientation of the pricing indicator in the electronic image; and
determining a plurality of real-time exchange rates from a plurality of foreign exchange currency servers.

15. The foreign currency transaction method of claim 13, wherein at least one of the plurality of payment cards is associated with a digital wallet of the user.

16. The foreign currency transaction method of claim 13, further comprising transmitting, to the user device, a value of at least one accruable incentive when using at least one of the plurality of payment cards for the payment card transaction.

17. The foreign currency transaction method of claim 16, wherein the at least one accruable incentive comprises incentive points and/or cashback.

18. The foreign currency transaction method of claim 13, further comprising defining, at the user device, the second currency type.

19. The foreign currency transaction method of claim 13, further comprising allowing, at the user device, an addition of a lock-in surcharge to each payable cost of the plurality of payable costs of the good/service in the second currency type, the lock-in surcharge being payable to ensure no variation in the payable cost of the good/service in the second currency type, wherein the transaction quantum includes the lock-in surcharge.

* * * * *